(12) United States Patent
Beach et al.

(10) Patent No.: US 7,440,781 B2
(45) Date of Patent: Oct. 21, 2008

(54) SYSTEM AND METHOD FOR POWER CONSERVATION IN A WIRELESS DEVICE

(75) Inventors: Robert Beach, Los Altos, CA (US); Puneet Batta, Santa Clara, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 442 days.

(21) Appl. No.: 11/245,576

(22) Filed: Oct. 7, 2005

(65) Prior Publication Data

US 2007/0082714 A1    Apr. 12, 2007

(51) Int. Cl.
    H04B 1/38 (2006.01)
(52) U.S. Cl. .................... 455/574; 455/343.3
(58) Field of Classification Search .......... None
    See application file for complete search history.

(56) References Cited

U.S. PATENT DOCUMENTS 5,978,366 A    11/1999  Massingill et al.
6,192,230 B1 *  2/2001  van Bokhorst et al. ... 455/343.3

FOREIGN PATENT DOCUMENTS

| EP | 0 907 262 | 4/1999 |
| WO | 00/22837 | 4/2000 |
| WO | 01/97538 | 12/2001 |

OTHER PUBLICATIONS

Kwak et al., "Support for STA power saving in 802.11v", IEEE 802.11-05/499 [online] May 2005, pp. 1-8.
"IEEE Standard Part 11: wireless LAN medium access control (MAC) and physical layer (PHY) specifications", ISO/IEC 8802-11, ANSI/IEEE Std 802.11-1999, ch. 11, Aug. 20, 1999, pp. 123-137.

* cited by examiner

Primary Examiner—Thanh C Le
(74) Attorney, Agent, or Firm—Fay Kaplun & Marcin, LLP

(57) ABSTRACT

Described is a system and method for power conservation in a wireless device. The method includes switching, by a wireless computing unit, from a first communication mode to a second communication mode at a predefined time interval. The unit receives wireless signals only when in the second communication mode, and the first communication mode is a power-save mode. The unit then receives a wireless signal, and initiates a wireless connection to a wireless arrangement to obtain traffic data from the wireless arrangement when the signal includes a traffic data indicator which is indicative of existence of the traffic data. The unit switches into the first communication mode when the indicator is absent from the signal.

25 Claims, 2 Drawing Sheets

SYSTEM AND METHOD FOR POWER CONSERVATION IN A WIRELESS DEVICE

BACKGROUND INFORMATION

A conventional mobile unit ("MU") establishes a connection to a wireless network via an access point ("AP") on power-up and maintains the connection until it is intentionally terminated (e.g., the MU is powered-down) or unintentionally terminated (e.g, connection is unavailable—beyond network's range). While connected to the network, the MU continuously monitors and reassess the connection with the AP. For example, the MU may scan for further networks, looks for a new access point ("AP") to associate with (i.e., roam) and carry out an authentication exchange with the new AP. These functions consume a significant amount of power from a battery utilized by the MU.

To reduce the power consumed, the MU utilizes a conventional power-save mode. While, in this mode, the MU cannot transmit or receive wireless signals but remains connected to the network (e.g., associated with the AP). Thus, the MU switches from the power-save mode to a wake mode at every predefined time interval (e.g., 1 sec—DTIM interval) to determine whether there is any traffic bound/buffered therefor (e.g., check DTIM). However, the switch between modes at each time interval causes the MU to exit the power-save mode even in instances when there is no traffic for the MU. Thus, the MU is inefficiently draining the battery and not conducting communications.

SUMMARY OF THE INVENTION

Described is a system and method for power conservation in a wireless device. The method includes switching, by a wireless computing unit, from a first communication mode to a second communication mode at a predefined time interval. The unit receives wireless signals only when in the second communication mode, and the first communication mode is a power-save mode. The unit then receives a wireless signal, and initiates a wireless connection to a wireless arrangement to obtain traffic data from the wireless arrangement when the signal includes a traffic data indicator which is indicative of existence of the traffic data. The unit switches into the first communication mode when the indicator is absent from the signal.

DETAILED DESCRIPTION

The present invention may be further understood with reference to the following description and the appended drawings. The present invention describes a system and method for conserving power in a wireless device. Although the present invention will be described with reference to conservation of a power source of the wireless device, those of skill in the art will understand that the system and method may be used to conserve other resources of the device such as, for example, processing time/power, memory used, etc.

Figure 1:
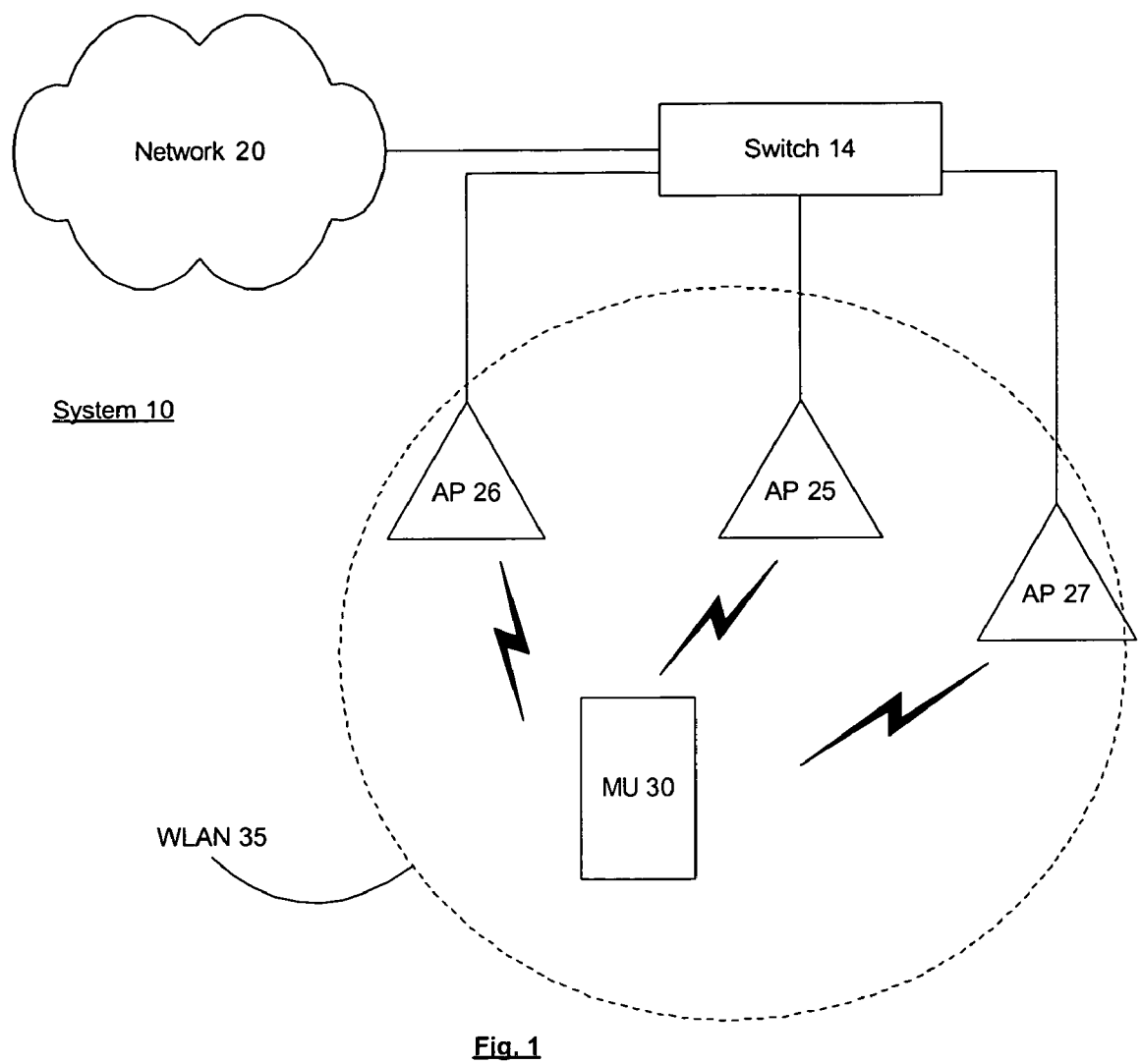
FIG. 1 is an exemplary embodiment of a system according to the present invention.

FIG. 1 shows an exemplary embodiment of a system 10 according to the present invention. The system 10 may include a network management arrangement (e.g., a switch 15) coupled to a communications network 20 and access point/port ("APs") 25, 26 and 27. Those of skill in the art will understand that the network management arrangement may be any device (e.g., hub, router, etc.) which manages a flow of network traffic to one or more devices coupled thereto. The switch 15 may be coupled to a server (not shown) for storing and processing data. The network 20 may be a LAN including interconnected networks, workstations, servers, databases, etc. The interconnections may be through dedicated connections (e.g., a private LAN) and/or via a public network (e.g., the Internet).

The AP 25 may be any device which converts a data packet from a wired communication protocol (e.g., TCP/IP) to a wireless communication protocol (e.g., IEEE 802.11, 802.16, etc.), and vice-versa. For example, the data packet may be routed to the AP 25 via the network 20 and the switch 15. When the AP 25 receives the data packet, it may be converted for transmission over a radio frequency ("RF") channel. Those of skill in the art will understand that the AP 25 may execute a similar procedure when receiving data packets over the RF channel which are bound for the switch 15 and/or the network 20. Further, the AP 25 may be connected directly to the network 20 or a server without the switch 15 as an intermediate device.

The system 10 further includes a wireless computing unit (e.g., a mobile unit ("MU") 30) capable of conducting wireless communications with the AP 25-27 and/or further MUs in a wireless communications network (e.g., a WLAN 35). The system 10 may include any number and/or type of APs and MUs. Those of skill in the art will understand that the MU 30 may be any device for conducting wireless communications including, but not limited to, a image- or laser-based barcode scanner, an RFID reader or tag, a cell phone, a PDA, a network interface card, a laptop, a handheld computer, etc.

According to the present invention, the MU 30 utilizes a power-save mode and a wake mode, but does not initiate a connection to the WLAN 35 until it detects that there is traffic bound/buffered therefor. Those of skill in the art will understand that the traffic may be one or more data, VoIP and/or management packets. For example, the traffic may be a VoIP call from the network 20 or within the WLAN 35 which is bound for the MU 30. The MU 30 may, upon power-up or while in the power-save mode, switch to the wake mode at every predefined time interval (e.g., about 3-5 seconds). In the wake mode, the MU 30 listens to wireless signals within its RF range to determine whether there is traffic for it.

In one embodiment, the MU 30 listens to a predetermined portion of the RF channel for a predetermined signal containing traffic data indicating that there is traffic for the MU 30. The traffic data may be, for example, an identifier (e.g., a MAC address) of the MU 30. In another embodiment, the identifier may be inserted into a field (e.g., created with TLV encoding) in a beacon transmitted by the APs in the WLAN 35. In a further embodiment, the identifier may be included in a broadcast packet periodically transmitted on the WLAN 35. In either of the embodiments, the inclusion of the identifier may be controlled by a server and/or the switch 15. For example, the server may buffer data for the MU and inform the APs to transmit the broadcast packets. The present invention will be described with reference to the identifier being included in the field in the beacon, though those of skill in the art will understand that any of the above-described embodiments may be utilized.

When there is traffic for the MU 30, one or more of the APs 25-27 may include the identifier for the MU 30 in the beacon transmitted therefrom (or in the broadcast packet). That is, in one embodiment, only a last AP which the MU 30 associated with includes the identifier in its beacon. In another embodiment, a location of the MU 30 may be determined, and all APs within a predefined range of the location may include the identifier in their beacons. In a further embodiment, every AP in the WLAN 35 may include the identifier in their beacon. Those of skill in the art will understand that, once there is traffic for the MU 30, the identifier may be included in a predetermined number (e.g., two or more) of subsequent beacons. This would prevent the MU 30 from missing the beacon with the identifier, and thus, missing the traffic.

When the MU 30 switches to the wake mode, it determines whether the identifier is present in any beacons that it hears. The MU 30 remains in the wake mode for a predefined duration (e.g., about 200-300 milliseconds) attempting to detect the identifier.

When the identifier is detected, the MU 30 initiates a connection with the WLAN 35 by, for example, performing a conventional roam. That is, the MU 30 may scan the APs in the RF range thereof, select an AP, initiate association and authentication with the AP and establish the connection to the WLAN 35. When connected, the MU 30 requests and receives the traffic from a server. Those of skill in the art will understand that the server may be merged with a switch and/or an AP. After receiving the traffic, the MU 30 may abandon the connection and revert to the wake mode or the power-save mode.

Figure 2:
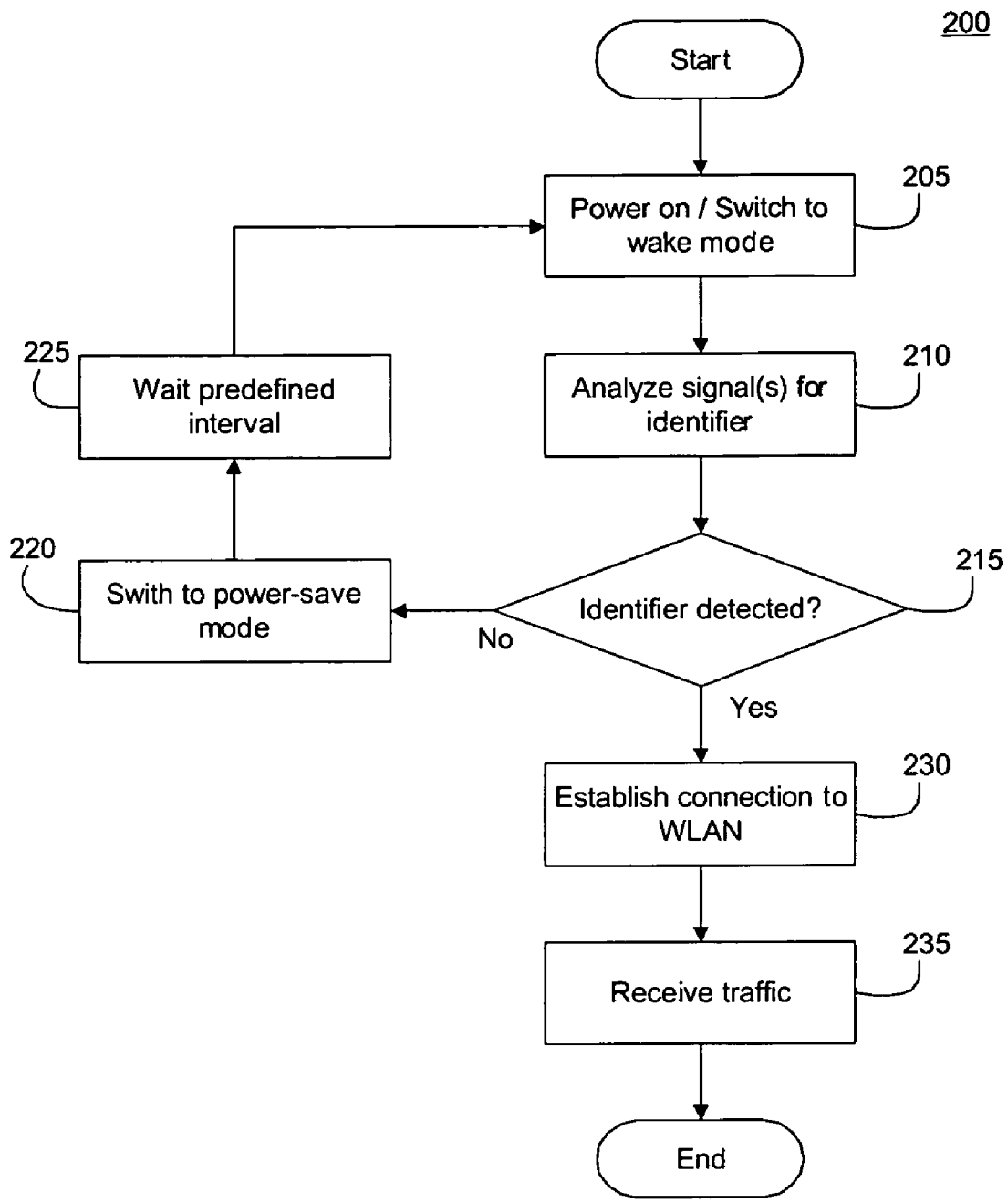
FIG. 2 is an exemplary embodiment of a method according to the present invention.

FIG. 2 shows an exemplary embodiment of a method 200 according to the present invention. In step 205, the MU 30 switches to the wake mode by, for example, powering-up and/or being removed from a charging device. While the method 200 may be initiated when the MU 30 is powered-up, those of skill in the art will understand that the method 200 may be implemented after the power-up. For example, the MU 30 may be in the power-save mode and switch to the wake mode at the predetermined time interval. In either manner, at this point, the MU 30 may be powered but disconnected from the WLAN 35 (e.g., not associated with any AP).

In step 210, the MU 30 analyzes the signals in its RF range (e.g., the beacon(s)) to determine whether the identifier is included therein. The MU 30 may utilize its transceiver to receive and demodulate the beacon(s) within its RF range. For each beacon received, the MU 30 may determine whether any of the fields include the identifier. In an alternative exemplary embodiment, the identifier may be a unique value assigned to the MU 30 by an AP or a server during a prior communication session. The prior session may also include the exchange of security data, e.g., encryption keys.

In step 215, the MU 30 determines whether the identifier has been detected. For example, when the MU 30 identifies its MAC address in one of the beacons, it determines that the identifier has been detected. As understood by those of skill in the art, the MU 30 may receive multiple beacons and each one may include the identifier. That is, the switch 15 and/or the server may instruct the APs 25-27 to include the identifier in their beacons so that no matter where the MU 30 is located, it will be notified that there is traffic for it. However, once the MU 30 detects the identifier, it may no longer receive further beacons.

In step 220, the MU 30 switches to the power-save mode, because the identifier has not been detected. That is, the MU 30 may remain in the wake mode for the predetermined duration. When the duration expires and the identifier has not been detected, the MU 30 may revert to the power-save mode. While in the power-save mode, the MU 30 may not attempt to establish a connection to the AP 25 and/or perform any networking functions (e.g., signal strength reading, authenticating) which would be performed by a conventional MU that is disconnected from the WLAN 35. The MU 30 remains in the power-save mode for the predetermined time interval (shown in step 225) before switching to the wake mode and re-analyzing the wireless signals to detect the identifier.

In step 230, the MU 30 has detected the identifier and proceeds to establish a connection to the WLAN 35. The connection may be established in a conventional manner. That is, the MU 30 may scan for signals from APs within the RF range thereof and determine a signal strength for each corresponding signal. Based on the signal strength (or some other condition, i.e., load), the MU 30 may execute an association and authentication handshake with the AP (e.g., AP 25). The MU 30 then receives the traffic through the connection with the AP 25, as shown in step 235.

The present invention provides certain advantages directed to conserving power utilized by the wireless computing units (e.g., MUs). For example, by switching to the wake mode at each predefined interval, a time the MU 30 spends in the wake mode is reduced which decreases power consumption by the MU 30. The power consumption is further decreased by allowing the MU 30 to be notified that there is traffic for it while it is disconnected from the WLAN 35. Thus, the MU 30 does not have to power its transceiver during an entire time the MU 30 is powered. For example, a user may use the MU 30 to scan barcodes and store the scan data locally. Then, when the MU 30 is going to receive or make a VoIP call, it will power the transceiver to do so. After the call, the scan data may be sent over the WLAN 35.

The reduction in power may extend conventional battery life and/or allow manufacturers to make smaller batteries. The smaller battery would decrease a size and weight of the MU 30, which are significant properties when dealing with mobile computing devices.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A method, comprising:
   switching, by a wireless computing unit, from a first communication mode to a second communication mode at a predefined time interval, wherein the unit receives wireless signals only when in the second communication mode, the first communication mode being a power-save mode; receiving a wireless signal by the unit;
   initiating a wireless connection to a wireless arrangement to obtain traffic data from the wireless arrangement when the signal includes a traffic data indicator, the indicator being indicative of existence of the traffic data; and
   switching the unit into the first communication mode when the indicator is absent from the signal, wherein a single absence of only the indicator in the signal is sufficient to switch the unit into the first communication mode.

2. The method according to claim 1, wherein the wireless arrangement includes at least one of a server, a switch, an access point and an access port.

3. The method according to claim 1, wherein the wireless computing unit includes at least one of an image-based scanner, a laser-based scanner, an RFID reader, a PDA, a cell phone and a network interface card.

4. The method according to claim 1, wherein the traffic data includes at least one of a data packet, a VoIP packet and a management packet addressed to the unit.

5. The method according to claim 1, wherein the predefined time interval is about 3 to 5 seconds.

6. The method according to claim 1, wherein the receiving step includes the following substep: screening wireless signals on a predetermined portion of a radio frequency channel for the signal which includes the indicator.

7. The method according to claim 1, further including: downloading the traffic data from the wireless arrangement.

8. The method according to claim 1, wherein the wireless signal is one of a beacon and a broadcast packet.

9. The method according to claim 1, further comprising before the first switching step: terminating the wireless connection to the wireless arrangement.

10. The method according to claim 1, wherein the indicator includes at least one of a MAC address of the unit and a unique identifier assigned to the unit by the wireless arrangement.

11. The method according to claim 1, wherein the indicator is a unique value assigned to the unit during a prior communication session.

12. A system, comprising:
a wireless computing unit having first and second communication modes, the first communication mode being a power-save mode, the unit receiving wireless signals only when in the second communication mode, the unit switching to the second mode at a predefined time interval; and
a network management arrangement transmitting a wireless signal with a traffic data indicator only when traffic data for the unit exists; wherein when the unit receives the signal including the indicator, the unit initiates a wireless connection to the arrangement to obtain the traffic data, wherein when the indicator is absent from the signal, the unit switches into the first mode, and wherein a single absence of only the indicator in the signal is sufficient to switch the unit into the first mode.

13. The system according to claim 12, wherein the arrangement includes at least one of a server, a switch, an access point and an access port.

14. The system according to claim 12, wherein the unit includes at least one of an image-based scanner, a laser-based scanner, an RFID reader, a PDA, a cell phone and a network interface card.

15. The system according to claim 12, wherein the traffic data includes at least one of a data packet, a VoIP packet and a management packet.

16. The system according to claim 12, wherein the predefined time interval is about 3 to 5 seconds.

17. The system according to claim 12, wherein the unit screens wireless signals on a predetermined portion of a radio frequency channel for the signal which includes the indicator.

18. The system according to claim 12, wherein the unit downloads the traffic data from the wireless arrangement.

19. The system according to claim 12, wherein the wireless signal is one of a beacon and a broadcast packet.

20. The system according to claim 12, wherein the indicator includes at least one of a MAC address of the unit and a unique identifier assigned to the unit by the wireless arrangement.

21. The system according to claim 12, wherein the indicator is a unique value assigned to the unit during a prior communication session.

22. An arrangement, comprising:
a processor switching from a first communication mode to a second communication mode at a predefined time interval; and
a communication arrangement receiving a wireless signal only when in the second communication mode, wherein the processor initiates a wireless connection to a wireless arrangement to obtain traffic data from the wireless arrangement when the signal includes a traffic data indicator, the indicator being indicative of existence of the traffic data, wherein a single absence of only the indicator in the signal is sufficient to switch the processor from the second communication mode to the first communication mode.

23. The arrangement according to claim 22, wherein the processor utilizes the connection to download the traffic data from the arrangement.

24. The arrangement according to claim 22, wherein the processor switches into the first mode when the indicator is absent from the signal.

25. The arrangement according to claim 22, wherein the indicator is a unique value assigned to a wireless unit that includes the processor during a prior communication session.

* * * * *